United States Patent [19]

de Lasada

[11] Patent Number: 5,269,232
[45] Date of Patent: Dec. 14, 1993

[54] SYSTEM OF REVOLVING SHELVES FOR FILING DOCUMENTS HAVING ALL THE SAME RECTANGULAR FORMAT

[76] Inventor: Jorge de Lasada, Apartado 2708, Lima, Peru

[21] Appl. No.: 272,140

[22] Filed: Nov. 16, 1988

[51] Int. Cl.⁵ .............................................. A47B 57/00
[52] U.S. Cl. ...................................... 108/94; 211/164
[58] Field of Search ................. 108/94, 111; 211/164; 312/305

[56] References Cited

U.S. PATENT DOCUMENTS

| | | |
|---|---|---|
| 914,078 | 3/1909 | Schauer . |
| 1,008,823 | 11/1911 | Hill . |
| 1,013,664 | 1/1912 | Lavoie . |
| 1,717,705 | 6/1929 | Hanney .............................. 211/164 |
| 1,867,145 | 7/1932 | Godfrey .............................. 211/164 |
| 2,562,593 | 7/1951 | Adams .......................... 211/164 X |
| 2,910,802 | 11/1959 | Garner .......................... 211/164 X |
| 3,034,657 | 5/1962 | Newmyer et al. . |
| 3,674,155 | 7/1972 | Kessler .......................... 211/164 X |
| 3,762,789 | 10/1973 | Robertson .......................... 312/305 |
| 4,303,283 | 12/1981 | Mueller .............................. 108/94 X |

FOREIGN PATENT DOCUMENTS

| | | |
|---|---|---|
| 3301680 | 7/1984 | Fed. Rep. of Germany . |
| 711157 | 9/1931 | France . |
| 23627 | of 1912 | United Kingdom . |

*Primary Examiner*—Jose V. Chen
*Attorney, Agent, or Firm*—Beveridge, DeGrandi, Weilacher & Young

[57] ABSTRACT

A rotary shelf assembly for storing documents, comprising:
  shelf members positioned along planes ratiating from a horizontal axis, said shelf members rotatably-supported about said horizontal axis and adapted to hold documents.

19 Claims, 3 Drawing Sheets

SYSTEM OF REVOLVING SHELVES FOR FILING DOCUMENTS HAVING ALL THE SAME RECTANGULAR FORMAT

DESCRIPTION OF THE INVENTION

Figure 2:
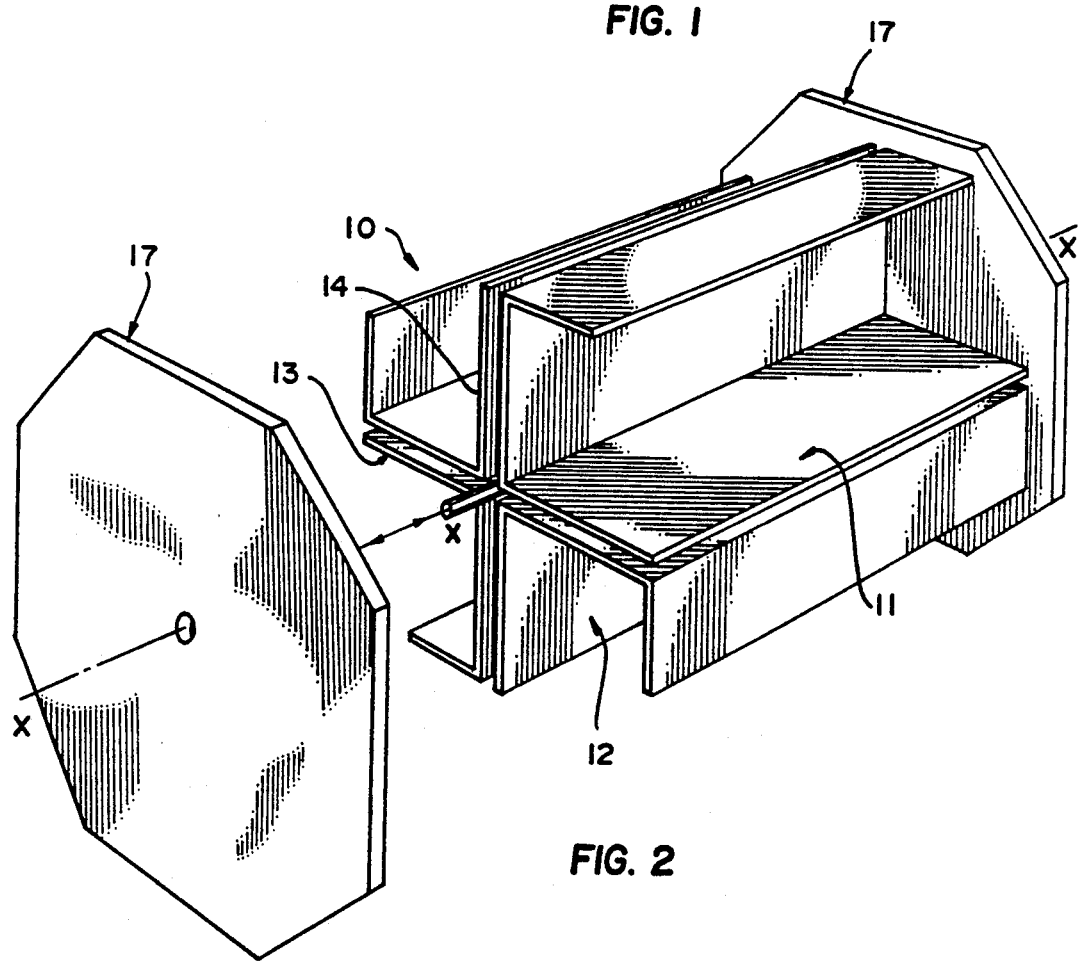
FIG. 2 is a view of a plurality of shelves of the invention.

Referring to FIG. 2, the shelf assembly 10 includes four shelves 11,12,13,14 rotatably-mounted about a horizontal axis X—X. Documents are placed on edge on the shelves, as books are usually placed on bookshelves, and arranged perpendicular to the horizontal axis X—X.

Figure 1:
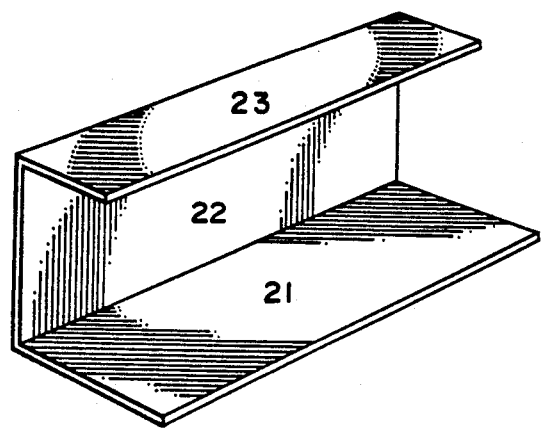
FIG. 1 is a view of one shelf of the invention.

Referring to FIG. 1, each of the four shelves is an elongate channel of three successively-connected rectangular flat plates including a first bottom or shelf plate 21, a second back plate 22, and a third top plate 23. The bottom plate 21 and the top plate 23 are parallel with each other and perpendicular to the back plate 22.

Figure 3:
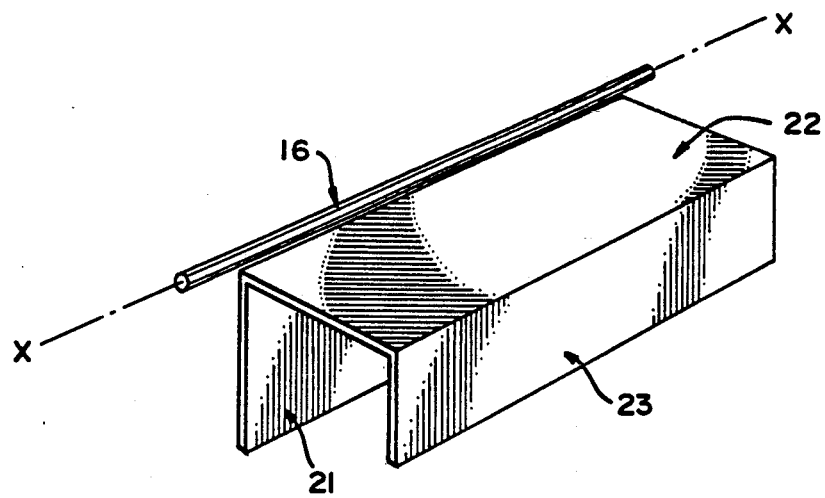
FIG. 3 is a view of the shelves in an angular position.

Referring to FIGS. 2 and 3, the four shelves are arranged around the horizontal axis X—X. A cylindrical, elongate rod 16, coaxial with the horizontal axis X—X, is used to rotatably-mount the shelves to a support structure (not shown). The shelves are arranged such that the corner edge formed by the intersection of the first bottom plate and the second back plate of each shelf is adjacent to and parallel with the elongate rod 16 and such that the bottom plate of one shelf is perpendicular to the bottom plate of adjacent shelves.

The ends of the shelves are closed-off by polygonal or circular end plates 17. The end plates 17 are arranged perpendicular to the horizontal axis X—X and connected to the ends of the shelves. The elongate rod 16 protrudes through the external faces of the plates 17 so that the shelves may be rotatably mounted to the support structure (not shown).

Figure 4:
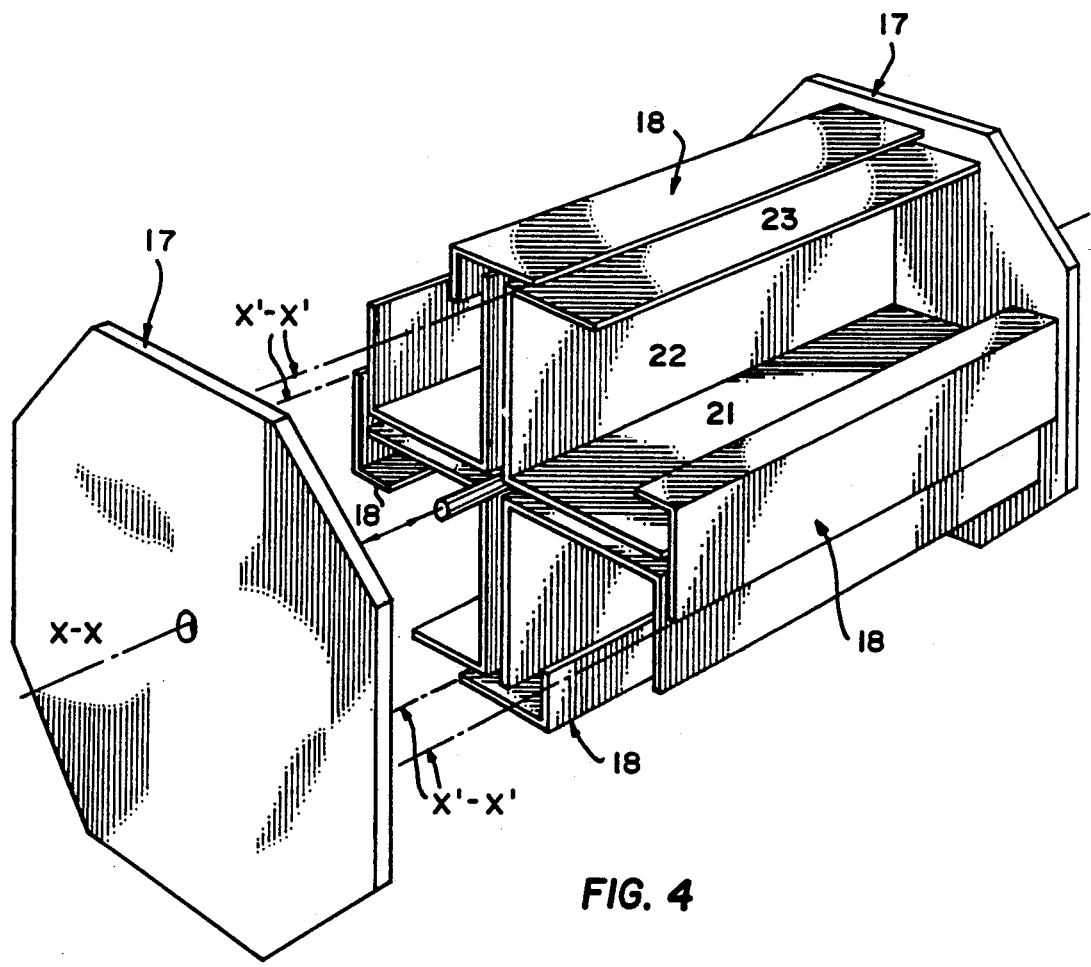
FIG. 4 is a view similar to FIG. 3, but also showing element 18.
Figure 5:
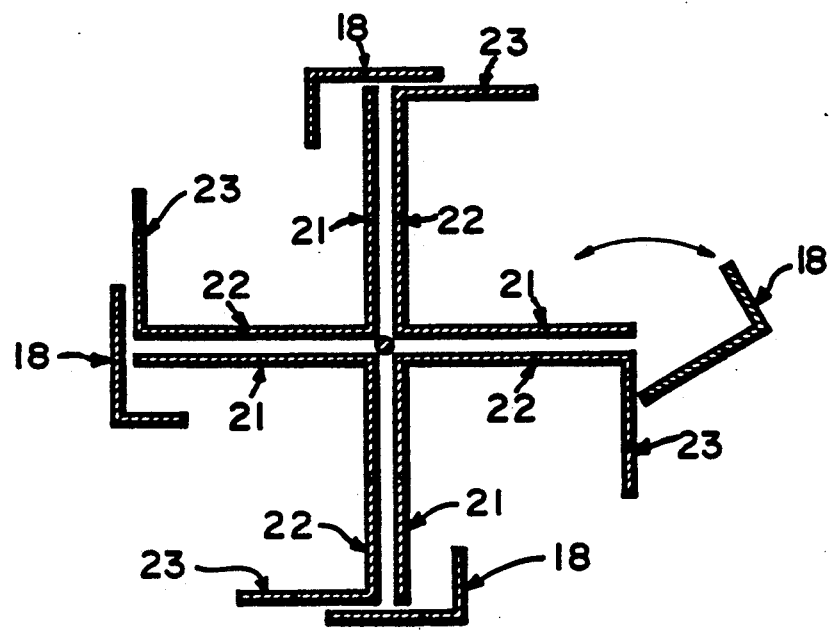
FIG. 5 is a view showing a cross section of FIG. 4.

Referring to FIGS. 4 and 5, a retainer plate 18 extends along the longitudinal edge of the bottom plate 21 of each shelf for retaining the documents on the shelves during rotation and for preventing the documents from falling off the shelves when in a rotated or upside-down position. Each retainer plate is pivotally-mounted between the end plates 17 to pivot about a horizontal axis X'—X' which is parallel to the horizontal axis X—X.

Each retainer plate has an angular cross-sectional shape with one leg extending inwardly toward the back plate 22 and the other leg extending to overlap the top plate of an adjacent shape. The shape of the cross-section and the position of the axis of each retainer plate 18 can vary so long as they prevent documents from falling off the shelf as it rotates.

The retainer plate 18 is positioned between the end plates 17 and pivotally-mounted on an axis parallel to the axis X—X by any one of a number of conventional means. Also, a conventional fixing device is provided for affixing the retainer plate 18 in either a position preventing the documents from falling off the shelf or a position permitting the documents to be inserted on or removed from the shelf.

In operation, documents are inserted in or removed from the unit by rotating any one of the four shelves to an upright position. The retainer plate is then unlatched and pivoted or moved to a position allowing insertion or removal of a document from the shelf. Afterwards, the retainer plate is pivoted or moved to a position which prevents the documents from falling out and affixed or latched in this position to retain the documents on the shelf during rotation.

Figure 6:
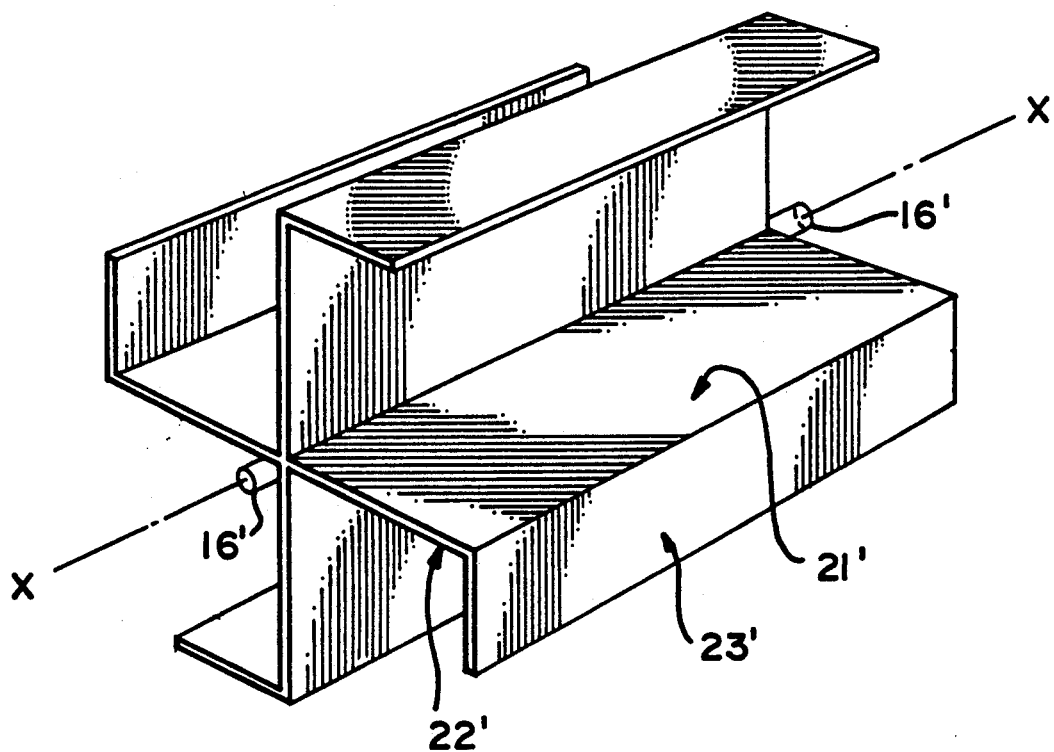
FIG. 6 is a view of an alternative embodiment.

Referring to FIG. 6, a preferable and alternative design of the above-described shelf assembly is shown. The four shelves are integrally-joined together such that the bottom plate 21' of each shelf also forms the back plate 22' of an adjacent shelf. Accordingly, the four integrally-joined shelves form an integral shelf assembly having a cross-section shaped like a swastika cross. The integral assembly rotates about a horizontal axis X—X which is coaxial with the linear intersection of the four shelves, i.e. the center axis of the swastika cross. End plates 17' and retainer plates 18' are provided on the integral shelf assembly in the same manner as previously described. A pin 16', coaxial with the horizontal axis X—X, protrudes from each of the end plates for rotatably-mounting the shelf assembly to rotate about the horizontal axis X—X.

I claim:

1. A rotary shelf assembly for storing documents, comprising:
   shelf members positioned along planes radiating from a horizontal axis, said shelf members rotatably-supported about said horizontal axis and adapted to hold documents; and
   stop members positioned along the sides and top of each of said shelf members, said stop members limiting movement of said documents as said shelf members are rotated about said horizontal axis.

2. A rotary shelf assembly according to claim 1 wherein one of said stop members positioned along the sides and top of each of said shelf members is movable between a first position limiting movement of said documents and a second position permitting insertion or removal of said documents.

3. A rotary shelf assembly according to claim 2 wherein four shelf units are arranged substantially radially around said horizontal axis.

4. A rotary shelf assembly according to claim 1 wherein said shelf members and said stop members together form a plurality of channel-shaped shelf units for holding said documents.

5. A rotary shelf assembly according to claim 4 wherein each of said shelf members comprises:
   a shelf plate extending substantially radially from said horizontal axis.

6. A rotary shelf assembly according to claim 5 wherein said stop members positioned along the sides and top of each of said shelf members comprise:
   a back plate extending substantially perpendicular from said shelf plate; and
   a top plate extending substantially perpendicular from said back plate, said shelf plate, back plate, and top plate forming each of said channel-shaped shelf units.

7. A rotary shelf assembly according to claim 6 wherein said stop members positioned along the sides and top of each of said shelf members further comprise:

a front plate extending along an open side of each of said channel-shaped shelf units, said plates limiting movement of said documents in a direction generally perpendicular to said horizontal axis.

8. A rotary shelf assembly according to claim 7 wherein said front plate pivots between a first position limiting movement of said documents when said shelves are rotated and a second position allowing removal or insertion of said documents when said shelf plate is in a substantially horizontal position and said back plate is in a substantially vertical position.

9. A rotary shelf assembly according to claim 8 further comprising:
a fixing device for affixing said front plate in said first position.

10. A rotary shelf assembly according to claim 7 wherein said stop members positioned along the sides and top of each of said shelf members further comprise:
an end plate connected to each of the ends of said shelf plates, said end plate limiting movement of said documents in a direction generally parallel with said horizontal axis.

11. A rotary shelf assembly according to claim 6 wherein said shelf plate of each of said shelf units is integral with the back plate of an adjacent shelf unit.

12. A rotary shelf assembly according to claim 4 further comprising:
an end plate at the ends of said shelf units.

13. A rotary shelf assembly according to claim 12 wherein said end plate has a polygonal or circular shape.

14. A rotary shelf assembly according to claim 4 further comprising:
a rod coaxially-aligned with said horizontal axis, said rod extending from each end of said shelf assembly and rotatably-supporting said shelf assembly.

15. A rotary shelf assembly for storing documents, comprising:
four shelf plates extending radially from a central, horizontal axis and forming four compartments for holding documents;
support means for rotatably supporting said shelf plates about said horizontal axis;
four first stop plates, each of said first stop plates extending substantially perpendicularly from a first side of a respective one of said shelf plates; and
four second stop plates, each of said second stop plates extending substantially perpendicularly from an opposite side of a respective one of said shelf plates, said first and second stop plates limiting movement of said documents in a direction generally perpendicular to said horizontal axis when said shelf plates are rotated about said horizontal axis.

16. A rotary shelf assembly according to claim 15 further comprising:
end plates connected to the end edges of said shelf plates, said end plates limiting movement of said documents in a direction generally parallel with said horizontal axis.

17. A rotary shelf assembly according to claim 15 wherein said second stop plates are pivotable between a first position limiting movement of said documents and a second position permitting insertion and removal of said documents.

18. A rotary shelf assembly according to claim 17 wherein said second stop plates are pivotally mounted to rotate about secondary axes parallel to said horizontal axis.

19. A rotary shelf assembly according to claim 17 further comprising:
fixing device for affixing said second stop plates in said first position.

* * * * *

UNITED STATES PATENT AND TRADEMARK OFFICE
CERTIFICATE OF CORRECTION

PATENT NO. : 5,269,232
DATED : December 14, 1993
INVENTOR(S) : Jorge de Losada

It is certified that error appears in the above-indentified patent and that said Letters Patent is hereby corrected as shown below:

On the title page, Items /19/ and /76/ "de Lasada", should read --de Losada--

Signed and Sealed this

Nineteenth Day of April, 1994

Attest:

BRUCE LEHMAN

*Attesting Officer*     *Commissioner of Patents and Trademarks*